(12) United States Patent
Thiel et al.

(10) Patent No.: US 7,463,960 B2
(45) Date of Patent: Dec. 9, 2008

(54) METHOD FOR ERROR DIAGNOSIS OF AN AMBIENT-PRESSURE SENSOR AND AN INTAKE-MANIFOLD PRESSURE SENSOR

(75) Inventors: Christof Thiel, Heilbronn (DE); Andreas Bethmann, Ditzingen (DE); Steffen Ziel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 11/433,141

(22) Filed: May 12, 2006

(65) Prior Publication Data
US 2006/0282200 A1  Dec. 14, 2006

(30) Foreign Application Priority Data
Jun. 14, 2005  (DE) .................. 10 2005 027 565

(51) Int. Cl.
*G01M 15/05* (2006.01)
(52) U.S. Cl. .......................... 701/34; 701/29
(58) Field of Classification Search ................ 701/29, 701/34, 36; 702/182–183; 123/378–382; 340/591
See application file for complete search history.

(56) References Cited

U.S. PATENT DOCUMENTS

| | | | | |
|---|---|---|---|---|
| 5,848,381 A | * | 12/1998 | Ishii et al. ..................... 702/99 |
| 5,880,361 A | * | 3/1999 | Taniguchi ................ 73/114.34 |
| 6,208,917 B1 | * | 3/2001 | McKissick et al. ............ 701/34 |
| 6,687,601 B2 | * | 2/2004 | Bale et al. ................... 701/108 |

\* cited by examiner

*Primary Examiner*—Yonel Beaulieu
(74) *Attorney, Agent, or Firm*—Kenyon & Kenyon LLP

(57) ABSTRACT

In a method for error diagnosis of an ambient-pressure sensor and an intake-manifold pressure sensor of an internal combustion engine, a defective intake-manifold pressure sensor or a defective ambient-pressure sensor is unambiguously detected by measuring the signals of the ambient-pressure sensor and the intake-manifold pressure sensor with the internal combustion engine stopped, and comparing the ambient pressure represented by the sensor signal of the ambient-pressure sensor to the intake-manifold pressure represented by the sensor signal of the intake-manifold pressure sensor to determine a pressure difference. If the determined pressure difference is greater than a predetermined maximum value, at least one additional sensor signal is measured with the internal combustion engine running, which additional sensor signal is used for identifying the defective sensor.

7 Claims, 3 Drawing Sheets

METHOD FOR ERROR DIAGNOSIS OF AN AMBIENT-PRESSURE SENSOR AND AN INTAKE-MANIFOLD PRESSURE SENSOR

FIELD OF THE INVENTION

The present invention relates to a method and a device for error diagnosis of an ambient-pressure sensor and an intake-manifold pressure sensor of an internal combustion engine.

BACKGROUND INFORMATION

In internal combustion engine control units there are diagnosis functions capable of detecting a malfunction of the individual pressure sensors. In systems having two pressure sensors, the known diagnosis functions may provide an incorrect diagnosis, e.g., identify the wrong sensor as being defective, which may result, for example, in replacement of an error-free sensor.

Misdiagnosis of a supposedly defective sensor results in the error-free sensor, rather than the defective sensor, being classified as defective, and possibly replaced, for example, in a workshop. This results furthermore in the vehicle possibly returning to the workshop for actually needed repairs, causing increased costs, because error-free sensors were previously replaced and now the defective sensor will need to be replaced.

An object of the present invention is therefore to be able to unambiguously detect a defective intake-manifold pressure sensor or a defective ambient-pressure sensor.

SUMMARY OF THE INVENTION

In an error diagnosis method according to the present invention for an ambient-pressure sensor and an intake-manifold pressure sensor of an internal combustion engine, signals of the ambient-pressure sensor and the intake-manifold pressure sensor are measured with the internal combustion engine stopped, and the ambient pressure represented by the sensor signal of the ambient-pressure sensor is compared to the intake-manifold pressure represented by the sensor signal of the intake-manifold pressure sensor to determine a difference. If the difference is greater than a predetermined maximum value, at least one additional sensor signal is measured with the internal combustion engine running, which additional sensor signal is used for identifying the defective sensor.

A pressure sensor error may be unambiguously inferred from the comparison in the engine control system between intake-manifold pressure and ambient pressure with the vehicle stopped. If an air volume flow meter, for example a hot-film air flow meter, is also installed, the defective sensor may be unambiguously identified during engine operation. The intake-manifold pressure is calculated by the control unit in operation (i.e., with the engine running) from the air volume measured by the air volume flow meter using an appropriate computing model. Subsequently, a comparison is made of whether the intake-manifold pressure determined from the model is equal to the actually measured intake manifold pressure. If this is the case, the difference between ambient pressure and intake manifold pressure, measured with the engine stopped (the ambient pressure is identical to the intake-manifold pressure with the engine stopped), is due to a defect in the ambient-pressure sensor. Otherwise, the difference measured with the internal combustion engine stopped is due to a defect in the intake-manifold pressure sensor.

The additional sensor signal may be delivered by an air volume flow meter. An additional intake-manifold pressure may be determined from the sensor signal of the air volume flow meter using a computing model. The computing model may be implemented as a program of a memory-programmable control system, which delivers a modeled (in other words, simulated or computed) intake-manifold pressure at the site of the intake-manifold pressure sensor.

In an example embodiment of the present invention, the intake-manifold pressure determined from the sensor signal of the air volume flow meter is compared to the intake-manifold pressure represented by the sensor signal of the intake-manifold pressure sensor, and the intake-manifold pressure sensor is classified as defective if the pressure difference is greater than a maximum value. Likewise, the intake-manifold pressure determined from the sensor signal of the air volume flow meter is compared to the intake-manifold pressure represented by the sensor signal of the intake-manifold pressure sensor, and the ambient-pressure sensor is classified as defective if the pressure difference is less than or equal to the maximum value.

In another example embodiment, the method according to the present invention includes the following steps:

a) measuring an ambient pressure, with the internal combustion engine stopped, from a signal of the ambient-pressure sensor representing the ambient pressure;

b) measuring an intake manifold pressure, with the internal combustion engine stopped, from a signal of the intake-manifold pressure sensor representing the intake manifold pressure;

c) setting an error suspicion if the pressure difference is greater than an allowable pressure difference;

d) determining a modeled intake-manifold pressure from a measured air volume during operation of the internal combustion engine;

e) measuring the intake manifold pressure, with the internal combustion engine running, from the signal of the intake-manifold sensor representing the intake manifold pressure;

f) setting an error entry for the intake-manifold pressure sensor if the pressure difference is greater than an allowable pressure difference; and g) setting an error entry for the ambient-pressure sensor if the pressure difference is less than or equal to an allowable pressure difference.

The present invention also provides a device, e.g., a control unit, for error diagnosis of an ambient-pressure sensor and an intake-manifold pressure sensor of an internal combustion engine, wherein signals of the ambient-pressure sensor and the intake-manifold pressure sensor may be measured with the internal combustion engine stopped, and the ambient pressure represented by the sensor signal of the ambient-pressure sensor may be compared to the intake-manifold pressure represented by the sensor signal of the intake-manifold pressure sensor to determine a difference. If the difference is greater than a predetermined maximum value, at least one additional sensor signal may be measured with the internal combustion engine running, which additional sensor signal is used for identifying the defective sensor.

DETAILED DESCRIPTION

Figure 1:
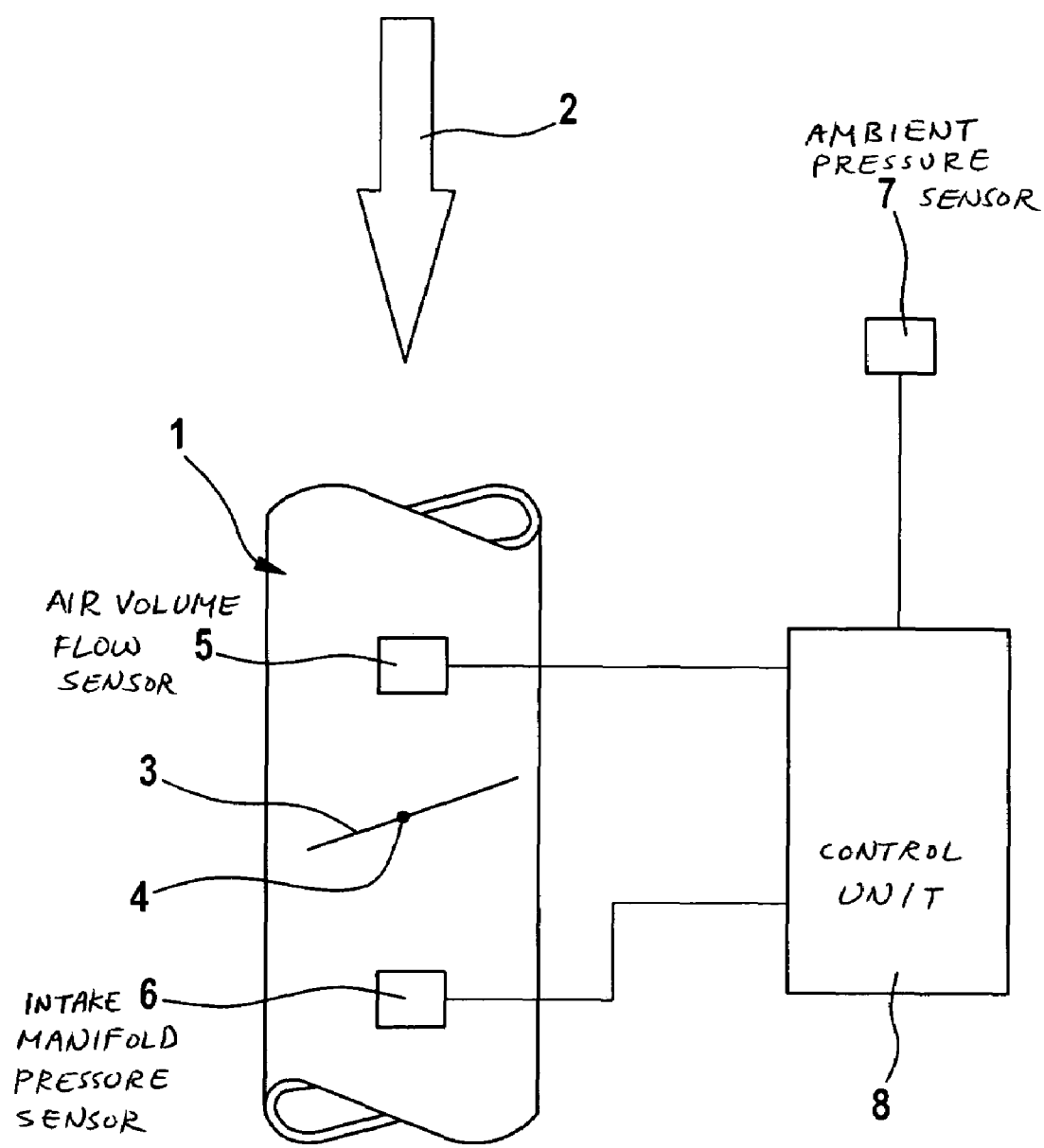
FIG. 1 shows a schematic drawing of part of an engine control system according to the present invention.

FIG. 1 shows a schematic drawing of part of an engine control system. It shows an intake manifold 1, e.g., of an internal combustion engine. The internal combustion engine may be a diesel engine or a gasoline engine, for example. An arrow 2 identifies the intake direction, i.e., the direction of the air flow through intake manifold 1. The direction of the arrow is identified as downstream and the direction against the direction of the arrow is identified as upstream. A throttle valve 3 which is mounted rotatably by an electric actuator (not illustrated in detail) about an axis 4 is situated in intake manifold 1. The setting of throttle valve 3 regulates the aspirated air volume. An air volume flow sensor 5, for example a hot-film air volume flow meter (HFM), which outputs an electric signal representing the air volume flowing through intake manifold 1, is situated upstream from throttle valve 3. There is an intake-manifold pressure sensor 6 situated downstream from throttle valve 3, which outputs an electric signal representing the static air pressure prevailing in intake manifold 1 downstream from throttle valve 3. Furthermore, an ambient-pressure sensor 7, which measures the static ambient pressure and outputs an electric signal representing the static ambient pressure, is situated at a suitable location in the vehicle. Air volume flow sensor 5, intake-manifold pressure sensor 6, and ambient-pressure sensor 7 are electrically connected to a control unit 8 and deliver electric signals to control unit 8, which signals represent the particular pressures and air volume flows measured. Control unit 8 is part of the engine control unit, or it may be the engine control unit itself, which controls the performance parameters of the internal combustion engine.

Figure 2:
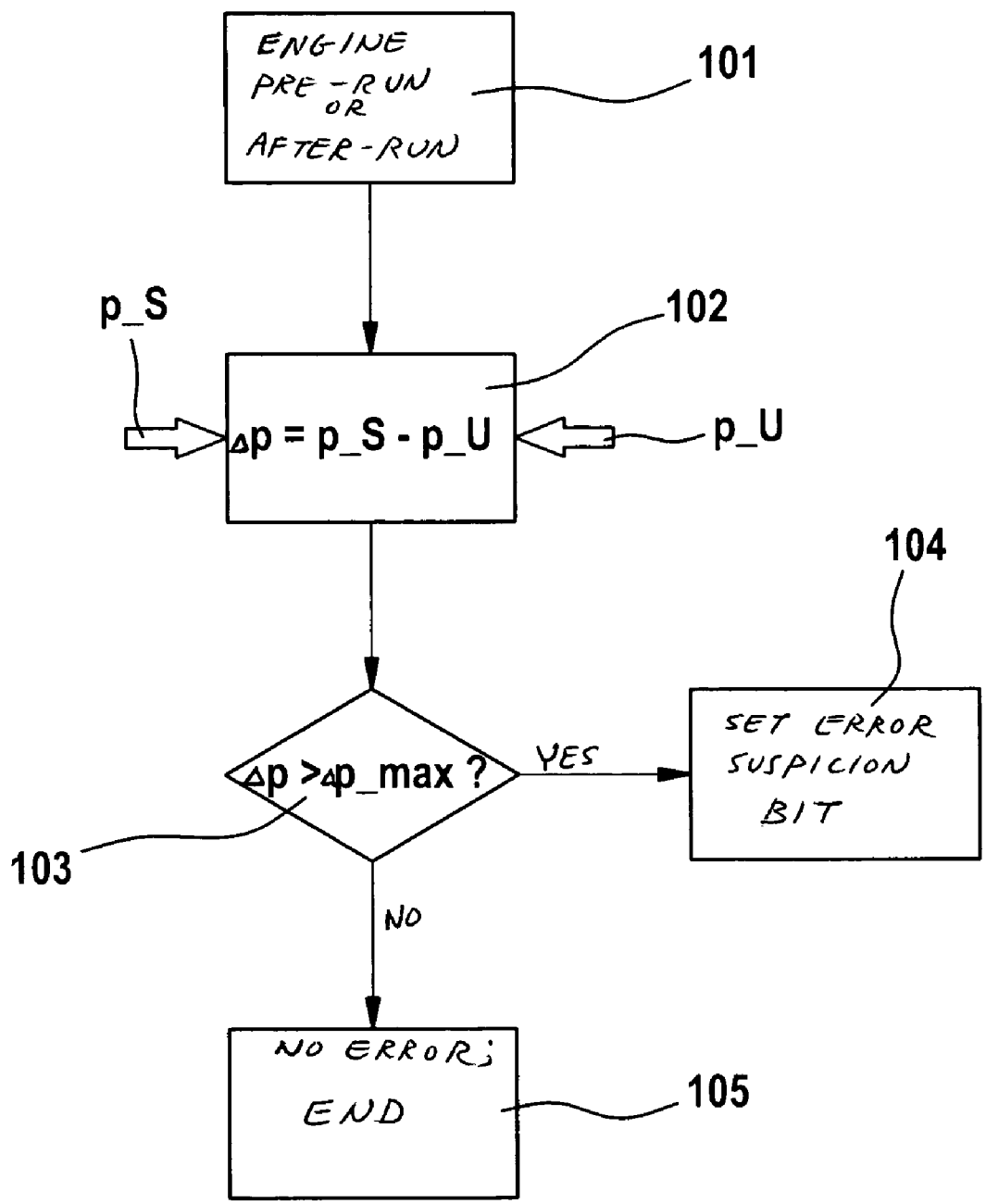
FIG. 2 shows a first flowchart illustrating a part of the method according to the present invention.

FIG. 2 shows the sequence of a first part of the method according to the present invention which makes it possible to detect a defective intake-manifold pressure sensor 6 or a defective ambient-pressure sensor 7. The portion of the method represented by FIG. 2 is executed with the internal combustion engine stopped, i.e., when the engine is not in operation. This may take place during the engine pre-run or engine after-run. Engine pre-run refers to the situation in which the electric units of the internal combustion engine have already been started up, but the internal combustion engine itself has not been started. Engine after-run refers to the situation in which the internal combustion engine itself is no longer in operation, but at least some of the associated electric units are kept operating, for example, to enable post-cooling or diagnosis of electric components or relieving of the injection system, or the like.

The method starts in a first step 101, when the internal combustion engine is in the pre-run or after-run phase. In the following step 102, static pressure p_S in the intake manifold measured by intake-manifold pressure sensor 6 is compared with ambient pressure p_U measured by ambient-pressure sensor 7 by determining the difference $\Delta p = p\_S - p\_U$, for example. Since the internal combustion engine is not running and thus no air flows through intake manifold 1, the two pressures are identical, so that the same pressure should be measured by both pressure sensors (of course, subject to the customary measurement tolerances). If the two pressure values differ, one of the two sensors is delivering an erroneous signal. No identification of the defective sensor, except for plausibility considerations (pressures which do not occur in typical operating environments of motor vehicles, for example, zero bar or two bar), is possible at this point. Therefore, in step 103 it is first checked by control unit 8 whether the pressure value measured by intake-manifold pressure sensor 6 differs from the value measured by ambient-pressure sensor 7 by more than a tolerable pressure value $\Delta p$. If this is the case, an error suspicion bit is set in step 104.

If the pressure difference $\Delta p = p\_S - p\_U$ is less than the maximum value $\Delta p\_max$, the program branches from query step 103 to "No," and both intake-manifold pressure sensor 6 and ambient-pressure sensor 7 are classified as error-free; consequently, no error suspicion bit is set, and the inquiry ends in step 105.

Figure 3:
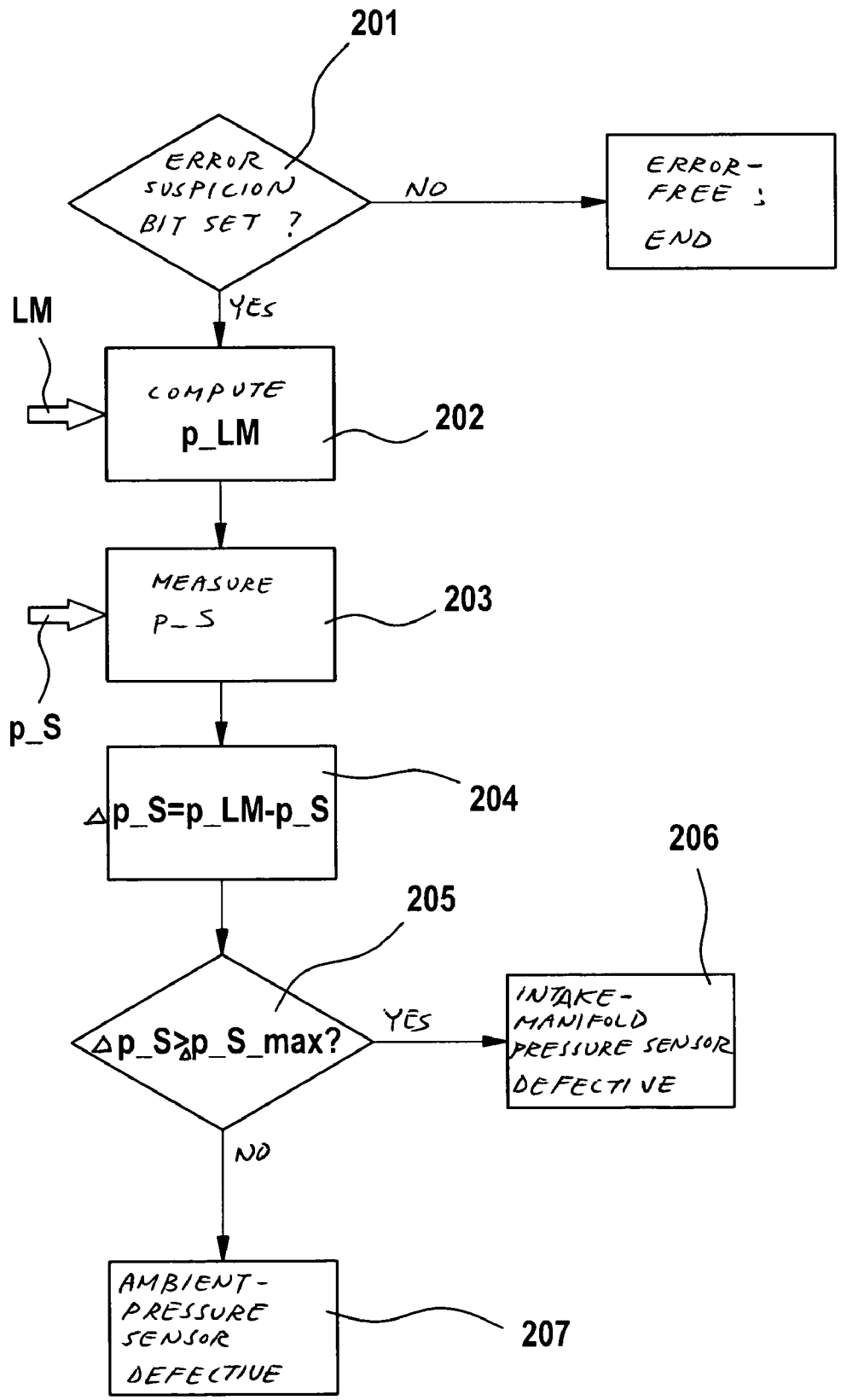
FIG. 3 shows a second flowchart illustrating another part of the method according to the present invention.

FIG. 3 shows the parts of the method taking place during operation of the internal combustion engine. It is first checked in 201, with the internal combustion engine running, whether the error suspicion bit has been set. If this is not the case, both intake-manifold pressure sensor 6 and ambient-pressure sensor 7 are error-free and no further testing takes place. In step 202 pressure p_LM, which should prevail at the site of intake-manifold pressure sensor 6 on the basis of the setting of the throttle valves, the amount of air flowing through, and possibly other parameters, is computed from air volume flow value LM measured by air volume flow sensor 5. Intake-manifold pressure p_S is measured by intake-manifold pressure sensor 6 in step 203. In step 204, the intake-manifold pressure difference $\Delta p\_S = p\_LM - p\_S$ is determined. In step 205 it is checked whether the pressure difference $\Delta p\_S$ is greater than a maximum allowable pressure difference $\Delta p\_S\_max$. If this is the case, in step 206 intake-manifold pressure sensor 6 is classified as defective, and an error bit is set, for example, in control unit 8. If the query in step 205 is answered by "No," i.e., the pressure difference $\Delta p\_S$ is less than a maximum allowable pressure difference $\Delta p\_S\_max$, in step 207 ambient-pressure sensor 7 is classified as defective, and an error bit is set in control unit 8.

What is claimed is:

1. A method for error diagnosis of an ambient-pressure sensor and an intake-manifold pressure sensor of an internal combustion engine, comprising:
    measuring a signal of the ambient-pressure sensor and a signal of the intake-manifold pressure sensor while the internal combustion engine is stopped;
    comparing an ambient pressure represented by the signal of the ambient-pressure sensor to a first intake-manifold pressure represented by the signal of the intake-manifold pressure sensor to determine a pressure difference; and
    if the pressure difference is greater than a predetermined maximum value, measuring at least one additional sensor signal while the internal combustion engine is running, wherein the at least one additional sensor signal is used for identifying a defective sensor.

2. The method as recited in claim 1, wherein the at least one additional sensor signal is delivered by an air volume flow meter.

3. The method as recited in claim 2, wherein a second intake-manifold pressure is determined from the at least one additional sensor signal delivered by the air volume flow meter, using a computing model.

4. The method as recited in claim 3, wherein the second intake-manifold pressure is compared to the first intake-manifold pressure, and wherein the intake-manifold pressure sensor is classified as defective if a pressure difference between the second intake-manifold pressure and the first intake-manifold pressure is greater than a predetermined maximum value.

5. The method as recited in claim 3, wherein the second intake-manifold pressure is compared to the first intake-manifold pressure, and wherein the ambient-pressure sensor is classified as defective if a pressure difference between the second intake-manifold pressure and the first intake-manifold pressure is one of: a) less than a predetermined maximum value; and b) equal to the predetermined maximum value.

6. A method for error diagnosis of an ambient-pressure sensor and an intake-manifold pressure sensor of an internal combustion engine, comprising:

determining an ambient pressure, while the internal combustion engine is stopped, from a signal of the ambient-pressure sensor;

determining a first intake-manifold pressure value, while the internal combustion engine is stopped, from a signal of the intake-manifold pressure sensor;

setting an error entry if a pressure difference between the ambient pressure and the intake-manifold pressure is greater than a first predetermined maximum pressure difference;

determining a second, modeled intake-manifold pressure value from a measured air volume, during operation of the internal combustion engine;

determining a third intake-manifold pressure value, while the internal combustion engine is running, from the signal of the intake-manifold pressure sensor;

setting an error entry for the intake-manifold pressure sensor if a pressure difference between the second, modeled intake-manifold pressure value and the third intake-manifold pressure value is greater than a second predetermined maximum pressure difference; and setting an error entry for the ambient-pressure sensor if the pressure difference between the second, modeled intake-manifold pressure value and the third intake-manifold pressure value is one of: a) less than the second predetermined maximum pressure difference; and b) equal to the second predetermined maximum pressure difference.

7. A control unit for error diagnosis of an ambient-pressure sensor and an intake-manifold pressure sensor of an internal combustion engine, comprising:

a means for comparing a signal of the ambient-pressure sensor and a signal of the intake-manifold pressure sensor measured while the internal combustion engine is stopped, to determine a first difference quantity; and a means for determining a modeled intake-manifold pressure value during operation of the internal combustion engine, if the first difference quantity is greater than a first predetermined maximum value;

a means for determining a second difference quantity between the modeled intake-manifold pressure value and an intake-manifold pressure value measured during operation the internal combustion engine; and a means for identifying a defective sensor, based on a comparison of the second difference quantity and a second predetermined maximum value.

* * * * *